Patented Nov. 30, 1943

2,335,701

UNITED STATES PATENT OFFICE 2,335,701

COATING COMPOSITION AND PROCESS OF MAKING IT

Frank B. Root, Montclair, N. J., assignor to Ellis-Foster Company, a corporation of New Jersey No Drawing. Application January 21, 1942, Serial No. 427,593

8 Claims. (Cl. 260—29)

This invention relates to fast-drying coating compositions and to the method of making them. In particular it relates to air-drying coating compositions which dry to an insoluble film permitting recoating in the same way as a conventional drying oil varnish but which are free from drying oils.

A conventional varnish consists of drying oil, resin, drier and thinner. Resin and drying oil are heated together to form a plastic mass and a liquid coating composition is formed by dissolving this in a volatile solvent or thinner and adding a drier. When the solution is applied to a surface the thinner evaporates leaving a sticky film of oil and resin. Subsequent oxidation of the oil produces a hard film which is no longer soluble in the solvents used in the original liquid composition. An oil varnish contains about 50 per cent film-forming materials and 50 per cent volatile thinners, which are lost. The thickness of the dried film is, therefore, about half the thickness of the wet film as applied, so that two or more coats are necessary to get the desired thickness of finish. Also suitable drying time between coats and often a light sanding must be provided. Although present-day varnishes dry much faster than older types, it remains that relatively long time is required in finishing with oil varnishes for the reason that drying is largely a surface action which requires adequate time. Also, the film must not be thick. Lacquers dry so much faster than varnishes that they are widely used in preference.

A lacquer consists of a solid film-forming material (nitrocellulose, shellac, etc.) dissolved in a volatile solvent. When a lacquer is applied to a surface the solvent evaporates leaving the solid film-forming material as a hard film. Drying is faster than with varnishes since hardening results from the mere evaporation of the solvent. However, a dried lacquer film is soluble in the original solvents used in preparing it, so that a lacquer can not readily be applied with a brush to undercoats. A clear lacquer of suitable spraying consistency may contain 10 to 20 per cent solids and 80 to 90 per cent of volatile relatively expensive solvents which are lost. The thickness of the final dried film is about a fifth that of the freshly applied film so that, in order to build up a finish of practical thickness, a large number of coats is necessary. A thick film of lacquer can not be applied because of the necessity for solvent to escape readily.

It is an object of the present invention to provide coating compositions of the varnish type which dry so rapidly that a large number of coats can be applied in a day, if desired. It is also an object to prepare coating compositions which contain a relatively high content of film-forming material so that a dried finish of practical thickness is obtained by using a less number of coats than with a drying oil varnish. It is a further object to prepare coating compositions which in film form dry on the interior and on the surface simultaneously, rather than first on the surface as is the case with those varnishes which depend on air-oxidation for hardening, thus allowing the material to be applied in thick layers. Still another object is to provide a varnish for wood which permits rubbing and polishing in a minimum of time or to provide floor varnishes, wood fillers and undercoats for conventional finishes. Other objects will be apparent from the following:

Furfuryl alcohol is a colorless, relatively high boiling liquid (B. P. 171° C.) which resinifies when in contact with acids. The resinification reaction is highly exothermic and may proceed with almost explosive violence. The resin which is formed is insoluble, infusible and dark colored (from deep yellow to black depending upon the amount of acid and the violence of the reaction). Furfuryl alcohol can be resinified in the form of a film by adding acid just before the film is applied, but the dried film is dark colored and the action of the acid continues after the film is dry so that shrinkage and increasing brittleness cause checking or cracking. Also, the mixture must be applied promptly, otherwise the alcohol becomes too viscous or resinifies before it can be used. Esters of furfuryl alcohol in general behave as does the alcohol itself. It is a further object of this invention to prepare coating compositions from liquid derivatives of furfuryl alcohol which are stable for a relatively long time before use and which dry very rapidly to light-colored, durable films. This object is brought about by the preparation of a liquid resin base comprising a furfuryl alcohol-modified urea-formaldehyde condensation product, and addition thereto of a stabilizer, a drying accelerator and a plasticizer.

The liquid resin base is prepared by heating a mixture of urea, aqueous formaldehyde and furfuryl alcohol (for example, a mixture consisting of 1 mole of urea, from 2 to 4 moles of formaldehyde and substantially 1 mole of furfuryl alcohol) to form a condensation product. Thiourea may be used in place of urea and formaldehyde polymers instead of the aqueous aldehyde.

Improved water resistance is imparted to the dried film by replacing part of the urea (say 5 to 25%) by an equivalent amount of a phenol. The condensation is preferably carried out in the presence of a very small amount of acid, such as that normally present in aqueous formaldehyde, although initial formation of a methylol urea may be done in neutral or slightly alkaline solution followed by condensation with furfuryl alcohol under slightly acid conditions. Water is removed by distillation (preferably under reduced pressure) and the reaction product is obtained as a viscous liquid. If the condensation mixture is too acid during reaction some insoluble methylene urea may form and this is removed by filtration before dehydration.

The liquid resin base dries very quickly when a small amount of acid is added. However, the film is discolored and the acidified solution gels very quickly. Addition of various solvents retards gelation of the acidified resin base somewhat. However, as will be shown later, tests with a large number of solvents indicate that there are only a few which both retard gelation of an acidified solution for an exceedingly long time and also yield films which are light colored. The amount of stabilizing solvent is not critical and need not exceed 20 per cent of the entire composition. Thus a coating composition is obtainable which contains upwards of 80% of film-forming materials.

This coating composition is very fast drying (for example, it may be made to air-dry in less than an hour) so that several coats may be applied during a day. Also, a first coat need not be thoroughly hard before a succeeding coat is applied. However, the fully dried coating is extremely hard so that checking is liable to occur relatively soon. Thus, a finish on wood made up of several coats of the resin base may show checking in a month or so, particularly if an unduly large amount of acid is used. Addition of certain plasticizers controls checking so that durable finishes are possible.

Plasticizers include the following types of materials: (a) glycerol sulfide (a viscous light-colored substance obtained, for example, by reaction of glycerol dichlorhydrin with sodium monosulfide) and reaction products of glycerol sulfide with formaldehyde and urea, thiourea or melamine; (b) unmodified alkyd resins, particularly those prepared from dihydric alcohols and dicarboxylic acids, for example, esters of maleic, fumaric, succinic and phthalic acids; and (c) glycerol sulfide-modified alkyd resins. It may be remarked that the oil-modified alkyd resins which are so useful in plasticizing ordinary alcohol-modified urea resins (e. g., butanol-modified urea-formaldehyde) are not usable with the products of the present invention. They are miscible in solution but yield cloudy films due to noncompatibility. The amount of plasticizer varies from about 10% to about 40% of the liquid resin base, depending mainly upon the use of the coating. Excessive amounts of plasticizer retard hardening of the film. Another type of plasticized (co-reaction) product is obtained by forming the furfuryl alcohol-modified urea-formaldehyde condensation product in the presence of the plasticizer.

Resins of generally alcohol-soluble type such as shellac, accroides or the gasoline insoluble residue obtained by extracting pine stumps (e. g., the resin sold as Vinsol) may be added to the compositions.

The amount of acid which is added to the composition before application as a varnish is controlled so that drying to a recoatable stage occurs in less than about an hour. Thus there is no appreciable loss of furfuryl alcohol by evaporation or dissociation from the composition. If too much acid is present the film dries with a yellow coloration and checks at an early date due to continuing action of the acid. With sulfuric acid the amount which produces suitable drying without yellowing and early checking is from about 0.3 to 0.7% of the composition. The same applies to such acids as sulfamic and toluenesulfonic. Oxalic, phosphoric and maleic acids may be used in slightly greater amount. In general, the acid to be used is a strong one and has a degree of dissociation greater than $1 \times 10^{-2}$. Peroxides (e. g., benzoyl peroxide) used along with an acid produce more rapid drying than an acid alone.

Since the proportion of acid which is used is small, acids are conveniently added as a solution in the stabilizing solvent.

The complete coating composition therefore comprises:

| | Parts |
|---|---|
| Liquid resin base | 100 |
| Plasticizer | 10–40 |
| Stabilizing solvent | 10–25 |
| Drying accelerator | 0.3–0.7 |

Pigments are incorporated to form enamels. Appropriate fillers and extenders are used to prepare sealers or pore fillers and undercoats.

It is a characteristic property of furfuryl alcohol that it yields a dark-colored resin when it polymerizes, the color ranging from deep yellow to black depending upon the conditions. Hence, it is surprising that the products of the present invention dry to light-colored films. It may be remarked that phenol-formaldehyde resins prepared in the presence of furfuryl alcohol yield dried films of very dark color. In one case, phenol and formaldehyde were reacted in furfuryl alcohol under alkaline conditions to yield a clear light-colored solution. When acidified and applied as a coating the film dried to a dark green color. The same was true of p-amylphenol. As mentioned above, improved water resistance of the products of this invention is obtained when a portion of the urea is replaced by a phenol. When as much as 25 per cent of the urea is replaced by a phenol such as amylphenol to yield a phenol-modified condensation product of furfuryl alcohol, urea and formaldehyde the acidified product dries to a light color. The attainment of light-colored dried films from compositions containing phenols is a novel feature of this invention. Phenols suitable for use herein include phenol, cresols, xylenols, phenylphenol and alkylated phenols.

The following examples are illustrative of the products of this invention. They are not to be construed as limiting since many variations in product and process are possible.

*Example 1*

| | Grams |
|---|---|
| Urea (1 mole) | 60 |
| Amylphenol (.04 mole) | 6.5 |
| 37½% aqueous formaldehyde (2.57 moles) | 206 |
| Furfuryl alcohol | 98 |

This mixture was heated to boiling under reflux for 2½ hours. During this time a small amount of white insoluble matter (methylene urea) precipitated. This was filtered off and the clear solution concentrated under reduced pressure to remove water. The product was a clear, somewhat viscous liquid. Addition of 5% of a 20% solution of sulfuric acid in ethyl alcohol produced a clear solution which when spread as a film dried to a yellow hard film in 35 minutes. The solution to which the acid was added rapidly darkened and became warm. In about 10 minutes it had formed a hard insoluble gel. When 20% of ethanol was added along with the acid solution, a film dried in about the same time and was light colored. Also, the acidified solution thinned with 20% of alcohol remained of substantially the same viscosity or brushing condition for about 5 hours with little change of color.

In order to define those solvents which, when added in relatively small amount, stabilize the liquid resin base to yield a composition having a lengthened working time and which composition produces fast-drying light-colored films, a large number of liquids were tested. It may be remarked that amyl alcohol and other aliphatic monohydric alcohols of more than 5 carbon atoms, butyl acetate, ethyl silicate, ethyl ether, isopropyl ether, methyl isobutyl ketone and hydrocarbons of various types are not solvents for the liquid resin base. However, such liquids may be used in mixture with a low boiling alcohol and may be desirable for blending other materials such as resins and plasticizers with the varnish base. The table shows the behavior of various solvents.

recoating can be done. "Dry" means that the film is hard and firm enough not to print when pressed with the finger. A "yellow" color of dried film is substantially the same degree of discoloration as shown by a phenolic resin varnish (for example, xylenol-formaldehyde and tung oil). "Working time" is the time during which the composition may be kept at room temperature (20° C.) and remain usable without further thinning. "Gel time" is when the composition no longer flows.

It is evident that stabilizers for the varnish base comprise those aliphatic monohydric alcohols of less than 5 carbon atoms

Example 2

A coating composition was formed by mixing

| | Parts |
|---|---|
| The resin base of Example 1 | 51 |
| Glycerol monosulfide | 9 |
| Denatured alcohol | 13 |
| A 20% solution of $H_2SO_4$ in alcohol | 2 |

A clear solution of brushing consistency was formed. Five coats were applied (on the same day) to a wooden panel in the following sequence

| | |
|---|---|
| 1st coat | 11:40 A. M. |
| 2nd coat | 1:10 P. M. |
| 3rd coat | 2:00 P. M. |
| 4th coat | 3:00 P. M. |
| 5th coat | 4:30 P. M. |

The following day the finish was rubbed and pol-

| | Solvent | Film dust-free | Film dry | Color of dried film | Working time solution | Gel time | Appearance of gel (24 hours) |
|---|---|---|---|---|---|---|---|
| | | Minutes | Minutes | | Minutes | Minutes | |
| 1 | Methanol | 17 | 35 | Light | 900 | 1,440 | Clear, very soft. |
| 2 | Alcohol (denatured) | 19 | 52 | do | 300 | 600 | Clear, soft. |
| 3 | Ethanol (100%) | 17 | 35 | do | 300 | 600 | Clear, very soft. |
| 4 | Isopropanol | 19 | 52 | do | 240 | 300 | Clear, soft. |
| 5 | Allyl alcohol | 26 | 77 | do | 300 | 600 | Do. |
| 6 | Butanol | 61 | 100 | do | 240 | 300 | Do. |
| 7 | Sec. butyl alcohol | 25 | 58 | do | 160 | 750 | Do. |
| 8 | Ter. butyl alcohol | 23 | 68 | do | 90 | 400 | Do. |
| 9 | Benzyl alcohol | 42 | 99 | Yellow | 27 | 100 | Clear, hard. |
| 10 | Diacetone alcohol | 26 | 56 | do | 15 | 25 | Do. |
| 11 | Cyclohexanol | 31 | 50 | do | 70 | 90 | Turbid, hard. |
| 12 | Ethylene glycol | 360 | 420 | Light | 420 | 900 | Clear, very soft. |
| 13 | Diethylene glycol | 100 | 360 | Yellow | 30 | 45 | Clear, soft. |
| 14 | Triethylene glycol | 45 | 120 | Light brown | 60 | 85 | Do. |
| 15 | Tetraethylene glycol | 40 | 225 | do | 120 | 900 | Do. |
| 16 | Hexaethylene glycol | 40 | 285 | do | 160 | 900 | Do. |
| 17 | Glycerol | 43 | 108 | do | 1,440 | (¹) | Clear liquid. |
| 18 | Glycol ethyl ether | 21 | 40 | Light | 93 | 120 | Clear, soft. |
| 19 | {Glycol ethyl ether 50%, Alcohol, 50%} | 25 | 80 | do | 200 | 400 | Do. |
| 20 | Ethyl lactate | 21 | 40 | do | 20 | 29 | Do. |
| 21 | Ethyl acetate | 22 | 41 | do | 10 | 14 | Opaque, hard. |
| 22 | Dioxane | 21 | 40 | do | 10 | 14 | Clear, hard. |
| 23 | Acetone | 19 | 38 | do | 7 | 10 | Do. |
| 24 | Cyclohexanone | 17 | 36 | do | 7 | 10 | Opaque, hard. |
| 25 | Chloroform | 17 | 36 | Yellow | 8 | 12 | Do. |
| 26 | Ethylene dichloride | 78 | 120 | Light | 24 | 120 | Clear, soft. |
| 27 | Ethylene dibromide | 37 | 52 | Yellow | 26 | 120 | Do. |
| 28 | Ethylene chlorhydrin | 44 | 84 | Light | 145 | 300 | Do. |
| 29 | Glycerol monochlorhydrin | 44 | 280 | Yellow | 120 | 300 | Do. |
| 30 | Glycerol dichlorhydrin | 68 | 345 | Light yellow | 160 | 300 | Do. |
| 31 | Nitromethane | 17 | 46 | Light | 10 | 16 | Cloudy, hard. |
| 32 | Nitroethane | 16 | 35 | do | 10 | 15 | Do. |
| 33 | Propionitrile | 25 | 46 | do | 23 | 120 | Turbid, hard. |
| 34 | {Alcohol, 50%, Toluol, 50%} | 17 | 35 | do | 75 | 116 | Clear, hard. |
| 35 | {Alochol, 75%, Toluol, 25%} | 25 | 55 | do | 300 | 600 | Clear, soft. |
| 36 | {Alcohol, 75%, Styrene, 25%} | 23 | 61 | do | 150 | 600 | Do. |
| 37 | {Alcohol, 75%, Ethyl silicate, 25%} | 23 | 53 | do | 180 | 720 | Do. |
| 38 | Furfuryl alcohol | 40 | 100 | Yellow | 3 | 7 | Clear, hard. |
| 39 | {Alcohol, 50%, Furfuryl alcohol, 50%} | 20 | 77 | Light yellow | 150 | 300 | Do. |
| 40 | Water | 17 | 35 | Light | 14 | 20 | Opaque, hard. |
| 41 | None | 17 | 35 | Yellow | 7 | 11 | Clear, hard. |

¹ No gel.

In the table "dust free" means the time required for the film to set up to a non-tacky but soft condition and represents the earliest time at which ished to a smooth surface. The finish was unnecessarily thick and was designed to illustrate the speed of drying and recoating. However, during a period of four months of exposure no indication of checking was observed, although a similar finish obtained in the same way but which contained no plasticizer showed pronounced checking in a few weeks.

The following are other examples of liquid resin bases which, when a gel-stabilizer, plasticizer and curing accelerator have been added, yield quick drying varnishes.

*Example 3*

| | Grams |
|---|---|
| Urea (1 mole) | 60 |
| Amylphenol (.04 mole) | 6.5 |
| 37½% aqueous formaldehyde (2.57 moles) | 206 |
| Furfuryl alcohol (1 mole) | 98 |
| Aqueous solution containing 0.056 g. KOH | 2.5 |

The alkali was used to neutralize the formaldehyde. The mixture was heated to boiling under reflux for one-half hour and then oxalic acid equivalent to the alkali was added. Heating was continued for 2 hours, after which water was removed under reduced pressure. The product was a clear varnish of brushing consistency.

*Example 4*

| | Grams |
|---|---|
| Urea (1 mole) | 60 |
| 37½% aqueous formaldehyde (2.5 moles) | 200 |
| Furfuryl alcohol (1 mole) | 98 |

Furfuryl alcohol and formaldehyde were heated to boiling under reflux, after which the urea (dissolved in 30 g. water) was added. Heating was continued for 2 hours. The mixture clouded somewhat on addition of the urea so that after heating it was filtered to remove a small amount (about 1 g.) of insoluble material. After filtration the solution was dehydrated to yield a clear varnish.

*Example 5*

| | Grams |
|---|---|
| Urea (1 mole) | 60 |
| Amylphenol (.12 mole) | 20 |
| 37½% aqueous formaldehyde (2.5 moles) | 200 |
| Furfuryl alcohol (1.1 moles) | 110 |

Amylphenol, furfuryl alcohol and formaldehyde were heated to boiling under reflux and to the hot solution the urea dissolved in 30 g. of water was added. Heating was continued for 2 hours. The solution was filtered to remove a small amount of insoluble material (about 1 g.) and the clear solution was dehydrated under reduced pressure.

*Example 6*

| | Grams |
|---|---|
| Urea | 60 |
| Amylphenol | 6.5 |
| Furfuryl alcohol | 98 |
| Formaldehyde solution (1.66 moles) | 133 |
| Solution containing 0.032 g. KOH | 2 |

*Example 7*

| | Grams |
|---|---|
| Urea | 60 |
| Amylphenol | 6.5 |
| Furfuryl alcohol | 98 |
| Formaldehyde solution (3 moles) | 240 |
| Solution containing 0.06 g. KOH | 3.6 |

In Examples 6 and 7 the amount of formaldehyde was varied from that used in Example 3. In both cases the ingredients were heated to boiling under reflux for ½ hour and to each oxalic acid equivalent to the alkali was added. Refluxing was continued for 2 hours after which the solutions were dehydrated.

The product of Example 6 was cloudy and dark-colored; the film (after adding 0.4% sulfuric acid) dried fast but showed very poor water-resistance compared with Example 3. The product of Example 7 was light-colored and dried rapidly to a light-colored film of high water-resistance. The range of formaldehyde required in the products of this invention include from about 2 to 4 moles of formaldehyde per mole of urea.

In the following example the proportion of furfuryl alcohol was increased over that of Example 3.

*Example 8*

| | Grams |
|---|---|
| Urea (1 mole) | 60 |
| Amylphenol (.04 mole) | 6.5 |
| Formaldehyde solution (2.57 moles) | 206 |
| Furfuryl alcohol (1.4 moles) | 144 |
| Solution containing 0.056 g. KOH | 2.5 |

This varnish was prepared in the same manner as Example 3. When first prepared the solution was clear but clouded on standing for 48 hours. When applied as a film the solution, to which acid and alcohol were added as in the product of Example 1, dried rapidly with a pronounced yellow color. Also the acidified solution showed a lower working time than Example 1.

The amount of furfuryl alcohol used in the products of the present invention should be substantially 1 mole per mole of urea (or urea+phenol). The amount may be as high as 1.1 moles but larger amounts cause yellowing. Lower amounts produce bases too heavy for brushing unless thinned excessively. Furthermore, it is impractical to thin a liquid varnish base with furfuryl alcohol to reduce the viscosity, since the presence of excess unreacted alcohol results in slower drying, yellow films and unstable solutions.

Specific plasticizers other than that used in Example 2 (glycerol monosulfide) are as follows:

A. Glycerol phthalate of acid number 54, formed by heating 1 mole of phthalic anhydride with 1.1 moles glycerol, an excess of polyhydric alcohol being used in order to get a product of low acid number. High acid number substances when mixed with the liquid resin base cause instability on storage.

B. Glycerol sulfide-modified diethylene glycol phthalate formed by heating a mixture of 26.5 parts glycerol monosulfide, 74 parts phthalic anhydride and 26.5 parts diethylene glycol at 180° C. for 1 hour.

C. A reaction product obtained by heating under reflux a mixture of 37.8 parts melamine, 74 parts aqueous formaldehyde, 367 parts glycerol monosulfide and 27 parts glycol monoethyl ether for 2 hours and dehydrating.

These plasticizers were used to form coating compositions of the following general formula:

| | Parts |
|---|---|
| Liquid resin base (Example 3) | 100 |
| Stabilizer (denatured alcohol) | 25 |
| Drier (20% solution H₂SO₄ in alcohol) | 3 |
| Plasticizer | 20 |

These coating compositions dried to a recoatable stage in less than an hour and formed light-colored films. The compositions had a working time of about 24 hours at 65° F.

The working time of the acidified compositions of this invention may be lengthened considerably by keeping them cool.

What I claim is:

1. A coating composition comprising a solution containing a condensation product of furfuryl alcohol, urea and formaldehyde in the proportions of from 2 to 4 moles of formaldehyde and substantially 1 mole of furfuryl alcohol per mole of urea, a drying accelerator therefor comprising an acid, a stabilizer comprising a monohydric aliphatic alcohol of less than 5 carbon atoms, and a plasticizer.

2. The composition of claim 1 wherein the condensation product of furfuryl alcohol, urea and formaldehyde is modified with a monohydric phenol.

3. The composition of claim 1 wherein the drying accelerator is an acid of dissociation greater than $1 \times 10^{-2}$ and present in amount sufficient to cause rapid drying to light-colored films.

4. A coating composition comprising an acidified solution containing a condensation product of amylphenol, urea, furfuryl alcohol and formaldehyde, an ethyl alcohol stabilizer and glycerol monosulfide as a plasticizer, the condensation product being formed from substantially 1 mole of furfuryl alcohol and from 2 to 4 moles of formaldehyde per mole of urea and amylphenol and the amylphenol being present in proportion up to 25% of the urea.

5. Process of making a coating composition which dries rapidly to a light-colored film, comprising providing a solution containing furfuryl alcohol-modified urea-formaldehyde condensation product formed from substantially 1 mole of furfuryl alcohol and from 2 to 4 moles of formaldehyde per mole of urea, a plasticizer therefor, and a stabilizing solvent comprising an aliphatic monohydric alcohol of less than 5 carbon atoms; and adding from 0.3 to 0.7 per cent of an acid thereto of dissociation constant greater than 0.01.

6. The composition of claim 1 wherein the plasticizer is a glycerol sulfide.

7. The composition of claim 1 wherein the plasticizer is a reaction product of a polycarboxylic acid and a polyhydric alcohol.

8. The composition of claim 1 wherein the plasticizer is a reaction product of a glycerol sulfide, a polycarboxylic acid and a polyhydric alcohol.

FRANK B. ROOT.